United States Patent

[11] 3,589,176

[72] Inventor James J. Wellons
 6029 Hazel Ave., Philadelphia, Pa. 19143
[21] Appl. No. 795,802
[22] Filed Feb. 3, 1969
[45] Patented June 29, 1971

[54] SYSTEM FOR CALCULATING REMAINING MILEAGE
 5 Claims, 1 Drawing Fig.
[52] U.S. Cl. .................................................. 73/113
[51] Int. Cl. ...................................................... G01m 13/26
[50] Field of Search ........................................ 73/432,
 113, 114; 235/150.21

[56] References Cited
UNITED STATES PATENTS
2,519,416 8/1950 Townsend .................... 73/113
3,029,632 4/1962 Nistri .......................... 73/113

Primary Examiner—S. Clement Swisher
Attorney—Seidel, Gonda and Goldhammer

ABSTRACT: A system for calculating the remaining mileage available on the remaining fuel of a vehicle comprises circuitry to solve the following equation:

$$MR = V \frac{\text{delta } T}{\text{delta } M} \cdot M$$

wherein:
MR = miles remaining
V = vehicle velocity in miles per second
delta T = sampling rate in seconds
delta M = the amount of fuel consumed in delta T
M = the amount of fuel remaining

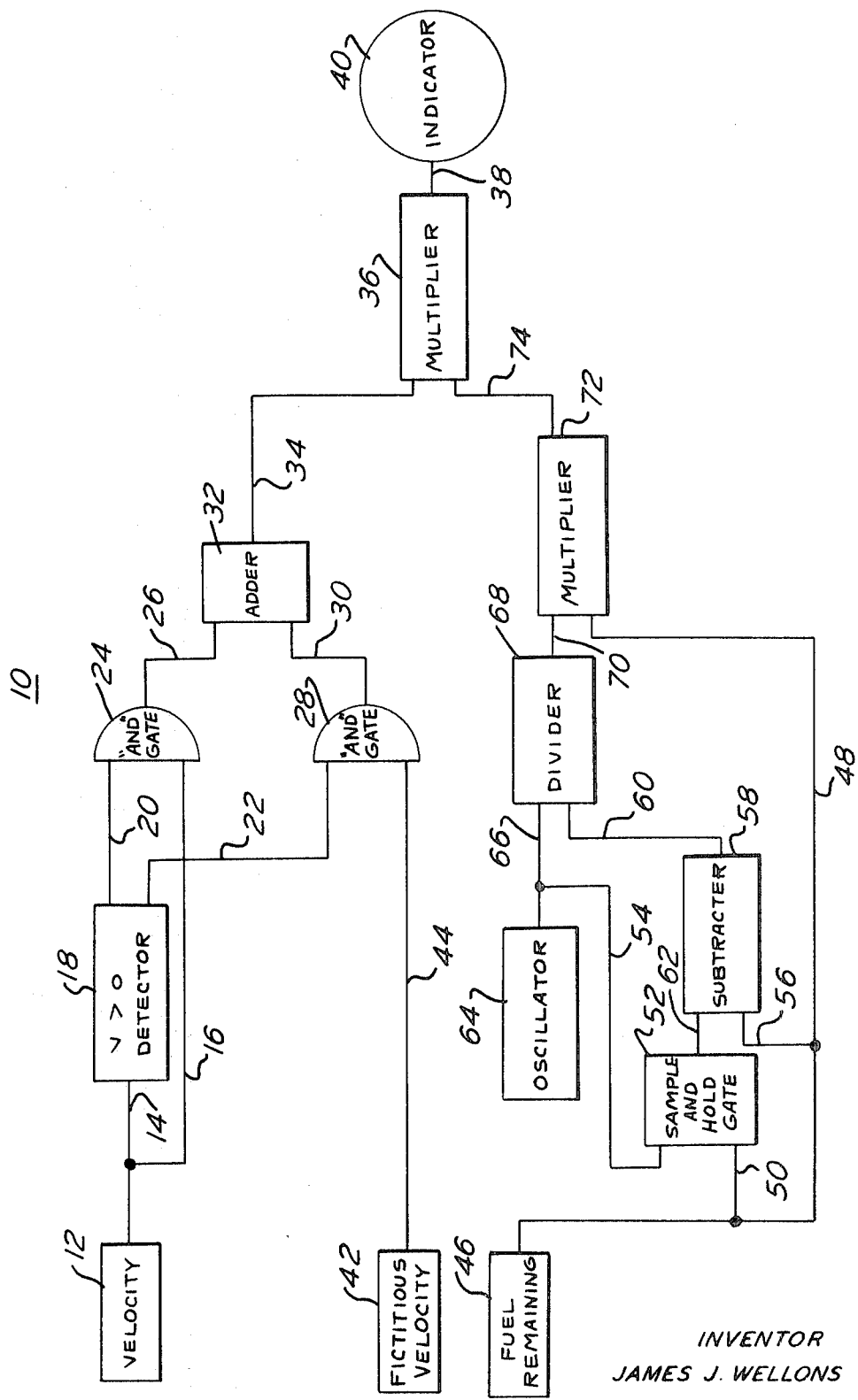

SYSTEM FOR CALCULATING REMAINING MILEAGE

This invention relates to a system for calculating mileage remaining. More particularly, the invention relates to a system for calculating the remaining mileage available on the remaining fuel of a vehicle.

It is an object of the invention to provide an operator of a motor vehicle with an indication of the remaining mileage available from the remaining fuel.

It is another object of the invention to provide a system for calculating remaining mileage that has few moving parts.

It is a further object of the invention to provide a mileage remaining indication system of high reliability that requires only a minimum of maintenance.

Other objects will appear hereinafter.

The present invention consists of an apparatus and method for calculating the remaining mileage available on the remaining fuel of a motor vehicle by solving the following equation:

$$MR = V \frac{\text{delta } T}{\text{delta } M} \cdot M$$

wherein:
MR = miles remaining
V = vehicle velocity in miles per second
delta T = sampling rate in seconds
delta M = the amount of fuel consumed in delta T
M = the amount of fuel remaining For the purpose of illustrating the invention, there is shown in the drawing a form which is presently preferred, it being understood, however, that the invention is not limited to the precise arrangements and instrumentalities shown.

Referring now to the drawing in detail, wherein like numerals identify like elements, there is shown a block diagram of the mileage remaining indicator system of the present invention designated generally as 10.

A vehicle velocity sensor 12 such as a speedometer having an electrical output is connected over conductor 16 to "AND" gate 24. Velocity sensor 12 is also connected over conductor 14 to velocity detector 18. Velocity detector 18 is connected over conductor 22 to "AND" gate 28.

Gate 28 is connected over conductor 30 to electronic adder 32. Gate 24 is connected over conductor 26 to adder 32. A fictitious velocity generator 42 is connected over conductor 44 to gate 28. Gate 28 is connected to adder 32 over conductor 30.

Fuel remaining detector 46 is connected over conductor 50 to a sample and hold gate 52. Fuel detector 46 is also connected to electronic multiplier 72 over conductor 48. In addition, fuel detector 46 is connected to electronic subtracter 58 over conductor 56.

Sample and hold gate 52 is connected over conductors 54 and 66 to electronic divider 68. Oscillator 64 is connected over conductor 66 to divider 68.

Sample and hold gate 52 is connected over conductor 62 to subtracter 58. Subtracter 58 is connected over conductor 60 to divider 68. Divider 68 is connected over conductor 70 to multiplier 72.

Adder 32 is connected over conductor 34 to multiplier 36. Multiplier 72 is connected over conductor 74 to multiplier 36. Multiplier 36 is connected over conductor 38 to mileage remaining indicator 40.

The operation of the system is as follows:

An electric signal representative of the velocity of the vehicle is generated by velocity sensor 12. This signal is transmitted over conductor 14 to velocity detector 18 which has two outputs. If the velocity of the vehicle is greater than zero, a signal is generated and sent over conductor 20 to gate 24. If the velocity of the vehicle is zero, no signal will be generated over conductor 20. However, a signal is then generated and sent over conductor 22 to gate 28 by detector 18.

Fictitious velocity generator 42 functions to generate a signal representative of a fictitious velocity. This velocity is preset by the operator when the vehicle velocity is equal to zero. The output signal is applied to adder 32 when the vehicle is standing still. Its application to adder 32 is controlled by gate 28.

Two inputs are necessary to generate an output from gate 28. One of these inputs is continuously generated by fictitious velocity generator 42. The other necessary input is generated by velocity detector 18 over conductor 22. This occurs only when the velocity of the vehicle is zero.

Similarly, two signals must be applied to the input of gate 24 to generate an output over conductor 26. Velocity sensor 12 generates a continuous signal representative of the velocity of the vehicle and transmits it to gate 24 over conductor 16. Velocity detector 18 applies an input signal to gate 24 over conductor 20 whenever the velocity of the vehicle is greater than zero.

Therefore, it may be seen that when the velocity of the vehicle is greater than zero, gate 24 will be actuated to provide a signal over conductor 26 to adder 32. When the vehicle is idling (the velocity is equal to zero), there will be no output signal from gate 24. However, there will be an output signal from gate 28 over conductor 30 to adder 32.

When the velocity of the vehicle is greater than zero, the signal transmitted from adder 32 over conductor 34 to multiplier 36 will be a signal representative of the velocity of the vehicle. When the vehicle is idling, the signal generated from adder 32 over conductor 34 to multiplier 36 will be a signal representative of a fictitious velocity.

Fuel remaining indicator 46 generates a signal representative of the supply of fuel remaining in the vehicle. This signal is transmitted over conductor 50 to sample and hold gate 52. Sample and hold gate 52 transmits the signal from fuel indicator 46 after a preset delay of delta T. The signal generated by sample and hold gate 52 is transmitted over conductor 62 to subtracter 58. The signal from fuel indicator 46 is also directly applied to subtracter 58.

Accordingly, subtracter 58 receives two signals. One signal is representative of the instantaneous amount of fuel remaining. The other signal is representative of the amount of fuel remaining delta T seconds earlier.

Subtracter 58 functions to subtract the signal transmitted over conductor 56 from the signal transmitted over conductor 62. The output signal from subtracter 58 is representative of the amount of fuel utilized in delta T seconds.

Oscillator 64 generates a periodic signal at intervals of delta T. This signal is applied over conductor 54 to sample and hold gate 52. This is done in order to effect a delay of the signal applied to gate 52 for a period of delta T. Oscillator 64 also generates a signal over conductor 66 to divider 68.

Divider 68 has two input signals. A signal representative of delta T is applied from oscillator 64 over conductor 66 to divider 68. A signal from subtracter 58 representative of delta M is applied over conductor 60 to divider 68.

Divider 68 effects the division of the input signal transmitted over conductor 66 by the input signal transmitted over conductor 60. Accordingly, the output signal of divider 68 is representative of the quantity delta T divided by delta M.

The output signal from divider 68 is transmitted over conductor 70 to multiplier 72. Fuel indicator 46 also applies a signal to multiplier 72. Multiplier 72 effects the multiplication of the inputs transmitted over conductors 48 and 70. Multiplier 72 multiplies delta T divided by delta M multiplied by M.

The signal from multiplier 72 is transmitted over conductor 74 to multiplier 36. Multiplier 36 multiplies the signals transmitted over conductors 34 and 74. The signal transmitted over conductor 34 will be equal to the velocity of the vehicle when the vehicle is moving. When the vehicle is standing still, a fictitious velocity will be transmitted over conductor 34. The signal transmitted over conductor 74 is equal to delta T divided by delta M multiplied by M.

Multiplier 36 effects the multiplication of the signals transmitted over conductors 34 and 74. The signal transmitted over conductor 34 will be representative of the velocity of the vehicle if the vehicle is in motion. If the vehicle is not moving, the signal transmitted over conductor 34 will be representative of a fictitious velocity. The signal transmitted over conductor 74 will be representative of the quantity delta T divided by delta M multiplied by M.

Therefore, it may be seen that multiplier 36 performs the following equation:

$$MR = V \frac{\text{delta } T}{\text{delta } M} \cdot M$$

wherein:
MR = miles remaining
V = vehicle velocity in miles per second
delta T = sampling rate in seconds
delta M = the amount of fuel consumed in delta T
M = the amount of fuel remaining The mileage remaining indication signal is transmitted over conductor 38 to mileage remaining indicator 40. Mileage remaining indicator 40 is displayed to the operator of the motor vehicle so that the remaining mileage available with the present quantity of fuel may be ascertained.

All components utilized in the invention are conventional "off the shelf" items. Accordingly, no useful purpose would be served by explaining in further detail the structure and circuitry of each representative block shown in the figure.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for indicating the remaining distance available for the remaining fuel in a vehicle comprising means for generating a first signal representative of the velocity of said vehicle, means for generating a second signal representative of said remaining fuel, means for generating a third signal representative of an interval of time, means for generating a fourth signal representative of the fuel consumed during said interval of time and means for forming the product of said first signal, said second signal, said third signal and the reciprocal of said fourth signal, said means for forming said product comprising a divider for dividing said third signal by said fourth signal to form a first quantity, a first multiplier for multiplying said first quantity by said second signal to form a second quantity, a second multiplier for multiplying said second quantity by said first signal to form a third quantity, and indicator means for displaying said third quantity.

2. Apparatus for indicating the remaining distance available for the remaining fuel in a vehicle comprising means for generating a first signal representative of the velocity of said vehicle, means for generating a second signal representative of said remaining fuel, means for generating a third signal representative of an interval of time, said last-named means including an oscillator, means for generating a fourth signal representative of the fuel consumed during said interval of time, and means for forming the product of said first signal, said second signal, said third signal and the reciprocal of said fourth signal.

3. Apparatus for indicating the remaining distance available for the remaining fuel in a vehicle comprising means for generating a first signal representative of the velocity of the vehicle, means for generating a second signal representative of said remaining fuel, means for generating a third signal representative of an interval of time, means for generating a fourth signal representative of the fuel consumed during said interval of time, means for forming the product of said first signal, said second signal, said third signal and the reciprocal of said fourth signal, and means for substituting a signal representative of a fictitious velocity for said first signal when said first signal is equal to zero.

4. Apparatus in accordance with claim 3 wherein said means for substituting includes a velocity detector, said velocity detector comprising an input for receiving said first signal, two outputs, means for generating a signal on one of said outputs when said first signal is greater than zero and means for generating a signal on the other of said outputs when said first signal is equal to zero.

5. A method for indicating the remaining distance available for the remaining fuel in a vehicle comprising generating a first signal representative of the velocity of the vehicle, generating a second signal representative of the remaining fuel, generating a third signal representative of an interval of time, generating a fourth signal representative of the fuel consumed during the interval of time, forming the product of the first signal, the second signal, the third signal, and the reciprocal of the fourth signal, said step of generating the fourth signal comprising generating a fifth signal representative of the fuel remaining, generating a sixth signal representative of the fuel remaining at a time one interval earlier, and subtracting the fifth signal from the sixth signal, and substituting a signal representative of a fictitious velocity for the first signal when the first signal is equal to zero.